Figure 1:
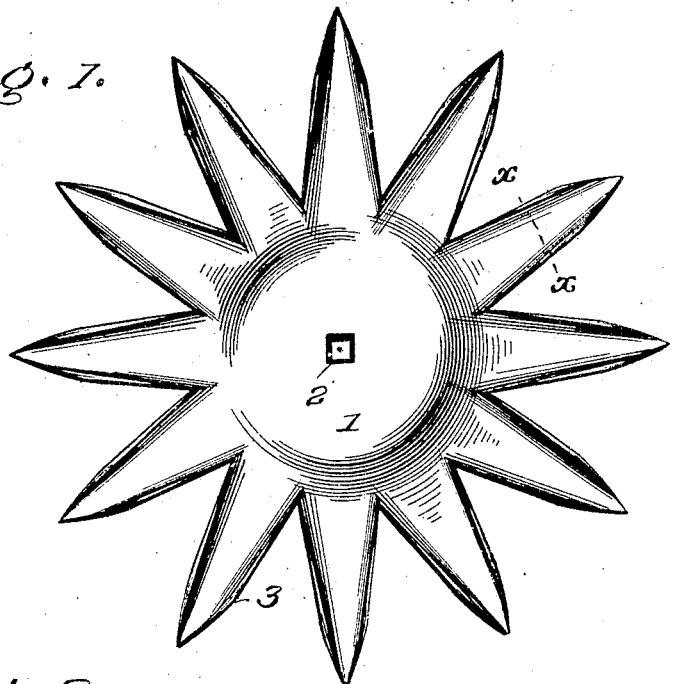

No. 849,386. PATENTED APR. 9, 1907.
J. R. GRIGG.
HARROW DISK.
APPLICATION FILED AUG. 10, 1906.

Witnesses
Inventor
J. R. Grigg
By Lacy,
Attorneys

UNITED STATES PATENT OFFICE.

JAMES R. GRIGG, OF ARAPAHO, OKLAHOMA TERRITORY.

HARROW-DISK.

No. 849,386.　　　Specification of Letters Patent.　　　Patented April 9, 1907.

Application filed August 10, 1906. Serial No. 330,078.

*To all whom it may concern:*

Be it known that I, JAMES R. GRIGG, a citizen of the United States, residing at Arapaho, in the county of Custer and Territory of Oklahoma, have invented certain new and useful Improvements in Harrow-Disks, of which the following is a specification.

The object of this invention is to provide a novel form of disk for harrows or similar agricultural implements, the essential feature of the invention residing in the peculiar and exact structure of the disk, whereby the thorough cultivation of the earth or soil operated upon thereby is facilitated.

A disk comprising the invention is of the type embodying the usual earth or soil working body from which extend a number of teeth or points each of which is of a peculiar form *per se* and which are peculiarly formed with the earth-working body above mentioned, as will be pointed out more clearly hereinafter and as is shown clearly in the drawings.

For a full understanding of the invention and the merits thereof and also to acquire a knowledge of the details of construction of the means for effecting the result reference is to be had to the following description and accompanying drawings, in which—

Figure 2:
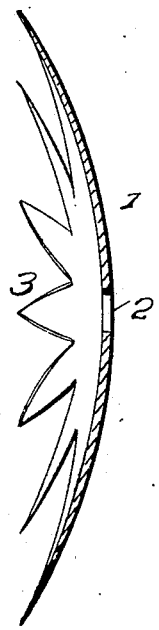
Figure 3:

Figure 1 is an elevation of a disk embodying the invention looking toward the concave side thereof. Fig. 2 is a vertical sectional view. Fig. 3 is a transverse section through one of the teeth or taken on the line $x$ $x$ of Fig. 1.

Corresponding and like parts are referred to in the following description and indicated in all the views of the drawings by the same reference characters.

Specifically describing the invention, the numeral 1 designates the body of the disk, and this body is of concavo-convex form, as is customary in the construction and manufacture of earth-treating means of this class. The earth-working body 1, above mentioned, is provided centrally thereof with a square or like opening 2, adapted to fit upon the shaft which carries the gangs of the disks comprising the invention in the actual use of the invention. Projecting from the peripheral portion of the body 1 of the disk are the points or teeth 3, each of which is of concave form in cross-section or transverse extent and each of which is of triangular shape in general conformation. The teeth or points 3 are integrally formed with the earth-working body 1 of the disk and are radial with respect thereto, the opposite edge portion of each tooth extending at the same angle with reference to the earth-working body 1, and the two edges of each tooth diverge toward the body 1 or point of integrality therewith.

In the actual manufacture of the invention a disk comprising the same may be formed out of pressed metal, and the concave portions of each tooth 3 form continuations of the concaved portion of the earth-working body 1 of the disk.

The peculiar formation of the disk, as hereinbefore set forth, is especially advantageous from the standpoint of actual results attained in the use of the device, the disks when in use in gangs being constructed so as to culitvate all classes of meadow lands and fields, increasing the production of the same materially over the more common types of disks at present in use.

So far as action of the disk with reference to the earth operated on thereby is concerned especial attention is directed to the fact that the structure is advantageous for the cultivation of alfalfa meadows, for the reason that the points of the disk will penetrate the ground or earth between the plants and loosen said earth without injuring said plants. This action is not performed by any other disks at present in use, so far as I am aware, and is extremely important, as it is well known that the earth of alfalfa lands becomes hard and compact, and it is extremely difficult to cultivate the same by using the round or common disk, as the latter cuts and scrapes off the crowns of the plants and injures them materially.

The use of my invention obviates the above difficulties and disadvantages. Of course my disk may be used in gangs and in various ways, and the number of points, as well as the size of the disks, may be varied at will.

Having thus described the invention, what is claimed as new is—

As an improved article of manufacture, the herein-described disk for agricultural implements, the same comprising a central earth-working body of concavo-convex form, and teeth radiating from the central body with their side edges converging to points at their outer ends, each of said teeth being concavo-convex in transverse section throughout its extent.

In testimony whereof I affix my signature in presence of two witnesses.

JAMES R. GRIGG. [L. S.]

Witnesses:
WALTER S. MILLS,
J. A. CARLBERG.